US005902655A

United States Patent [19]

Matsuoka et al.

[11] Patent Number: 5,902,655
[45] Date of Patent: *May 11, 1999

[54] MULTI-LAYER LAMINATE MOLDING

[75] Inventors: Masami Matsuoka; Hikaru Aoyagi; Kazuaki Naito; Katsunori Saito, all of Kawasaki, Japan

[73] Assignee: Showa Denko K.K., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/754,945

[22] Filed: Nov. 25, 1996

Related U.S. Application Data

[63] Continuation of application No. 08/515,469, Aug. 15, 1995, abandoned, which is a continuation of application No. 08/249,293, May 25, 1994, abandoned, which is a continuation of application No. 07/867,671, Jul. 6, 1992, abandoned.

[30] Foreign Application Priority Data

Nov. 9, 1990 [JP] Japan ............................. 305801/1990
Nov. 19, 1990 [JP] Japan ............................. 315484/1990
Sep. 4, 1991 [WO] WIPO ...................... PCT/JP91/01182

[51] Int. Cl.$^6$ .................................................. B29D 22/00
[52] U.S. Cl. ........................ 428/35.2; 428/35.7; 428/213; 525/193; 525/240
[58] Field of Search ................... 428/35.2, 35.7, 428/36.7, 36.8, 213, 214, 355, 483, 492; 525/193, 240

[56] References Cited

U.S. PATENT DOCUMENTS 5,045,401  9/1991  Tabor et al. ............................. 428/516
5,073,420  12/1991  Yano et al. ............................. 428/35.7
5,305,239  4/1994  Kinra ...................................... 364/507

*Primary Examiner*—Cecilia J. Tsang
*Assistant Examiner*—Patrick R. Delaney
*Attorney, Agent, or Firm*—Antonelli, Terry, Stout & Kraus, LLP

[57] ABSTRACT

There is disclosed a multi-layer laminate molding having a layer structure that a main material layer made mainly of a polyethylenic resin at the outer side and an ethylene-vinyl acetate copolymer saponified product layer or polyamide resin layer at the inner side are laminated through at least an adhesive material layer, the adhesive material layer comprising a resin composition containing (A) 60 to 95% by weight of at least one resin selected from the-group consisting of (1) a high density polyethylenic resin having specified physical properties, (2) a linear low density polyethylenic resin having specified physical properties, (3) a modified high density polyethylenic resin obtained by grafting unsaturated carboxylic acid and the like onto the above (1), and (4) a modified linear low density polyethylenic resin obtained by grafting unsaturated carboxylic acid and the-like onto the above (2), and containing at least 0.1% by weight of (3) and/or (4) and (B) 40 to 5% by weight of a linear ultra low density polyethylenic resin having specified, physical properties said resin composition having a proportion of the unsaturated carboxylic acid and the like grafted of 0.001 to 50% by weight, the difference in acoustic impedance between the main material layer and adhesive material layer being at least $8.5 \times 10^{-3}$ g/cm$^2 \cdot \mu$sec. This multi-layer laminate molding is excellent in barrier properties, and nondestructive detection of the adhesive material layer can be carried out easily by the supersonic wave reflection method.

14 Claims, 1 Drawing Sheet

FIG. 1

MULTI-LAYER LAMINATE MOLDING

This application is a continuation application of application Ser. 08/515,469, filed Aug. 15, 1995, now abandoned, which application is a continuation application of Ser. No. 08/249,293, filed May 25, 1994 (now abandoned) which application is a continuation application of Ser. No. 867,671, filed Jul. 6, 1992 (now abandoned).

TECHNICAL FIELD

The present invention relates to a multi-layer laminate molding having a laminate structure of at least 3-kind 3-layers between which a specified adhesive material layer is sandwiched, and more particularly, to a useful multi-layer laminate-molding of a containers a wrapping bag, various members, and the like, in which the presence or absence of the adhesive material layer can be detected in a non-destructive state by using a supersonic wave reflection method, and which is excellent in barrier properties and has greatly suitable characteristics for quality control or process control.

BACKGROUND ART

As has heretofore been well known, multi-layer laminate moldings obtained by laminating a-non-polyolefinic resin, such as a polyamide resin (PA), a polyester resin, a saponified-product of an ethylene-vinyl acetate copolymer (ethylene-vinyl alcohol copolymer), a halogen-containing resin, e.g., a polyvinyl chloride resin (PVC) and a polyvinylidene chloride resin (PVDC), a polycarbonate resin (PC), and a polymer alloy of a polyphenylene oxide resin and PA, a foil of metal, such as aluminum, iron, copper, tin, nickel and the like, an alloy containing the metal as a major component (for example, stainless steel), and the like, a synthetic resin film having aluminum, silica and the like vacuum-deposited thereon, and so forth, have functions of barrier properties against gas and steam, an improvement in the appearance, such as surface gloss, coating properties, and so forth, and are widely used as various moldings, such as wrapping containers, wrapping bags, and industrial members.

Many of these multi-layer laminate moldings employ, as a main material layer, from viewpoints of an economical point, moldability and workability, sealability, moisture resistance and water resistance, and to forth, a structure that a high-pressure-process polyethylenic resin (low density polyethylenic resin), a moderate or low-pressure-process polyethylenic-resin (linear low density to high density polyethylenic resin), a polypropylenic resin an olefinic copolymer resin and a composition containing these as the major component and various fillers, such as calcium carbonate, talc, mica, glass fibers, carbon fibers, organic fibers and the like; compounded thereto; if necessary.

Since these polyolefinic resins have a non-polar molecular structure, they are poor in adhesive properties to, affinity to, and compatibility with the aforementioned-non-polyolefinic resins, metallic materials and the like, and imparting the aforementioned characteristics by polar monomer modification (graft polymerization) of the polyolefinic resin, using a copolymer of olefin (particularly ethylene) and a polar monomer, compounding (blending) a polar resin, or treating with chemical, or physical means, is widely employed. Particularly in the case that molding is conducted by a coextrusion method, it is well known that with a so-called modified polyolefinic resin modified with a polar monomer, as an adhesive material, a multi-layer laminate with the aforementioned various materials is produced (for example, Japanese Patent Publication Nos. 12782/1986 and 39448/1980, and "'87-2 (Wrapping Material Report), Trend of Market and Course of Development of Coextrusion Multi-Layer Films and Sheets (Sogo Hoso Shuppan Co, Ltd., published on Feb. 27, 1987, pages 285 to 293).

When such multi-layer laminates are produced, it is considered that with one-way Containers and the like which are relatively short in the period of use, and are not subject to high impact at the step of production of products or commodities, and at the step of transportation, there is no high need for performance such as interlayer adhesive strength. However, with moldings such as containers, bags, members and the like which are required to have long term durability and high resistance against vibration and-various types of impact, not only adhesive performance and durability of the adhesive material layer are of great importance, but also it is more important and necessary to confirm the presence or absence of the adhesive material layer constituting the molding, at a desired position.

If in the multi-layer laminate molding, particularly a container, a bag and the like, there is a site where the adhesive layer is, entirely or partially, removed owing to an unidentified cause, it is a risk that mechanical characteristics could be reduced. In the evaluation of durability over a long period, when the contents are liquid or gaseous, there is a possibility that the contents remain in the disconnected point, exerting influences on the whole of the multi-layer laminate molding, reducing the performance, and moreover reducing the appearance, and finally reducing the product value. Moreover, there is a possibility that water, moisture and the like from the atmosphere remain in the disconnected point, exerting the same influences as above.

Accordingly, when there are such possibilities, it is necessary to confirm that the adhesive material layer in the multi-layer laminate molding is present over the whole of the desired place. There has not been known a method which enables to detect the presence of the adhesive material layer, easily and economically, without destructing the multi-layer laminate molding.

Although as a method of confirming in advance the presence of the adhesive material layers of the multi-layer laminate molding, a method in which part of the laminate molding is cut and the cross section of the cut portion is examined by various techniques (for example, examination using a magnifying loupes, an optical microscope, and the like), is in general use, a sample used for this confirmation cannot be used as a molding. In accordance with this method, it is only assumed that the adhesive material layer in the multi-layer laminate molding could be present; this method is not a sufficiently sure method.

On the other hand, in multi-layer laminate moldings which are of relatively high transparency, the presence of the adhesive material layer can be confirmed by employing an optically analytical technique and so forth. However, this method is limited to relatively thin ones, and influenced by the molecular structure of the non-polyolefinic resin material Therefore, the method lacks reliability.

Moreover, a method may be considered, in which the adhesive material layer is colored by using an adhesive material in which a colorant, such as pigment, is compounded, and the presence of the adhesive material layer is confirmed with the sight or by the use of a color difference meter and so forth. However, the method imposes serious limitations to the product appearance, and when-the outer-layer is opaque and the thickness of the layer is large, the method is not applicable.

Accordingly, in general, the aforementioned methods confirming in advance, and a technique in which the presence of the adhesive material layer is-controlled by checking the amounts of the adhesive material used before and after molding of the product, and by comparing the amount of the adhesive material used with the amount calculated or estimated from the thickness, surface area and density of the adhesive material layer in the laminate molding, are employed. In addition, there is proposed a method in which a detecting medium, such as iron powder or glass fiber, is introduced into a specified layer in multi-layer extrusion molding, and detected by the use of a magnetic sensor or a supersonic wave head, respectively (Japanese Patent Application Laid-Open No. 260417/1988). This introduction, however, is not practical in respect of reduction in adhesive properties, durability, flexibility, impact resistance and so forth.

In recent years, it has been proposed to use a laminate molding as a fuel oil container, such as an automobile tank, which is required to have long term durability and high resistance against vibration and various types of impact.

Heretofore, metallic tanks have been used, but the trend is moving to tanks made of synthetic resins from view-points of reduction in the-weight of the tank, freedom of the shape, an increase in the volume, anti-rusting properties, and so forth (for example, Tsuzuki et al. "Plastics" Vol. 23, No. 8, page 52 (1972), ibid,, Vol. 23, No. 5, page 113 (1972), ibid., Vol. 23, No. 11, page 131 (1972), "Nikkei New Materials" published on Feb. 29, 1988, pages 34 to 35, and Hara et al., "Plastics" Vol. 39, No. 6, page 109 (1988)). In addition, for improving gas-liquid barrier property of fuel oil there is proposed a fuel oil container comprising a plurality of layers, in which the number of layers in the tank is increased, and as the material of each layer, a high density polyethylenic resin, a modified polyethylenic resin, a polyamide resin and the like are used (for example, Kurihara et ale, SAE Technical Paper Series, No. 870304 (23 to Feb. 27, 1987), Fukuhara, "Plastics Age" Vol. 35, No. 3, page 129 (1989)). In connection with the structure, there are a 3-type 3-layer structure in which a high density polyethylenic resin is used as the outer layer, a modified polyethylenic layer is used as the intermediate layer, and a polyamide resin is used as the inner layer, and a 3-type 5-layer structure in which a high density polyethylenic resin is used as the inner and outer layers, a polyamide resin is used as the intermediate layer, and an adhesive layer is provided between each of the inner and outer layers, and the intermediate layer; they are considered greatly promising as fuel tanks having permeation resistance against fuel oil.

As similar ones, there are, for example, multi-layer. moldings comprising at least a modified polyolefinic resin layer having adhesive properties to a polyamide resin/a polyamide resin layer, or a modified polyolefinic resin layer/polyamide resin layer/a modified polyolefinic-resin layers A polyamide resin such as polyamide 6 (Nylon 6) and the like has excellent permeation resistance against fuel oil, particularly gasoline.

On the other hand, in view of recent circumstances, so-called alcohol mixed gasoline-as obtained by mixing alcohol, such as methyl alcohol, ethyl alcohol or the like, with gasoline has already been used in areas mainly with South America, and this tendency is gradually spreading over areas with North America as the center. Investigation of material exhibiting good barrier performance when used for such so-called alcohol mixed gasoline confirmed that a saponified product of an ethylene-vinyl acetate copolymer (hereinafter referred to as "EVOH") is excellent.

Moreover, in addition to the fact that polyethylenic adhesive materials heretofore known are seriously insufficient in respect of adhesive properties to EVOH or PA and long term adhesive durability, it is greatly important, as described hereinafter, in containers having such a multi-layer structure that the positive presence of the adhesive material layer between the main material layer and the barrier material such as EVOH or PA is confirmed.

The reason is that a fuel oil tank mounted on a car is estimated to be one of the important safety parts and is required to-have greatly severe and high level performance Accordingly the case is the same with a multi-layer fuel tank provided with permeation resistance against fuel oil. For a modified polyethylenic resin as the adhesive material and the barrier layer to be used in such tanks, more stringent performance as a tank are required. With regard to the adhesive resin as used herein, it is necessary that adhesive properties to the polyethylenic resin and EVOH or PA and the long term durability under various circumstances are excellent, excellent mechanical-characteristics, thermal characteristics and chemical characteristics are possessed, and moldability and workability are good. Moreover, since these characteristics are exhibited greatly on condition that the adhesive material layer surely exists in the molding, it is more important to establish a method of confirming the presence or absence of the adhesive material layer.

In summary, if in the multi-layer liquid fuel oil tank, there is a site where the adhesive layer is, entirely or partially, removed owing to an unidentified cause, not only mechanical characteristics such as impact resistance are reduced, but also in connection with the long term durability, the fuel oil and the like remain in the removed site, seriously reducing various performances of the tank and causing serious problems. For this reason, with commodities such as the aforementioned multi-layer laminate fuel oil tanks, confirmation of the presence of the adhesive material layer has become an indispensable, important item of control. However, an established technique to confirm the presence of the adhesive material layer without destructing the product having such a multi-layer structure, has not been known at all as described hereinbefore. Although detecting the . presence of the EVOH layer in the above multi-layer structure without destructing the container can be attained by using a super sonic wave reflection method, it is difficult to detect the presence of the adhesive material layer in the multi-layer laminate molding having the structure of EVOH or PA layer/adhesive material layer/main material layer, without destructing the molding, and no attempts has been made.

Although the invention described in the aforementioned Japanese Patent Application Laid-Open No. 260417/1988 is fairly effective more concrete examples and data of various materials are not available, and moreover it is considered that the invention has a problem in respect of follow-up properties in detection when the rate of injection of the multi-layer parison is high. Furthermore, since it is important, as described above, that the presence of the layer in the container is finally confirmed, the invention is considered to be inadequate in those points.

In addition, multi-layer laminate moldings such as containers and bags for use in industrial chemicals, or edible oil and water-containing foodstuffs, more particularly juice, fruits, vegetables, meat, fish and so forth, are required to have particularly high barrier properties, water resistance and durability in order to prevent deterioration of quality of the contents, and it is important that the adhesive material layer is detected without breaking the molding.

As described above, as multi-layer laminate moldings, such as containers and bags, for which are required long term durability, barrier properties, and high resistance against vibration and various types of impact, for example, fuel oil containers and edible oil containers, no sufficiently satisfactory ones have been proposed yet.

Thus the present inventors have made various investigations about a method of detection using supersonic wave and a combination of a main-material layer composed mainly of a polyolefinic resin and an adhesive material layer in order to overcome the above problems of, the prior art techniques and, as a result, it has been discovered that non-destructive detection of the adhesive material layer using the supersonic wave reflection method, which has not heretofore been known, can be attained by using a specified adhesive material and controlling a difference in acoustic impedance between the main material layer and the adhesive material layer to a specified value or more.

Based on the findings, the present invention has been accomplished, and the object of the present invention is to provide a multi-layer laminate molding which Is excellent in characteristics such as barrier properties, permits non-destructive detection of an adhesive material layer, and is free of a site where the adhesive material layer is removed even if partially.

DISCLOSURE OF INVENTION

That is to say, the present invention provides a multi-layer-laminate molding having a layer structure that a main material layer containing a polyethylenic resin as a major component at the outside and a layer of a saponified product of an ethylene-vinyl acetate copolymer (EVOH) or a layer of a polyamide resin,(PA) at the inside-are laminated with at least an adhesive material layer sandwiched therebetween, wherein:

the adhesive material layer comprises a resin composition containing:

(A) 60 to 95% by weight of a polyethylenic resin selected from the group consisting of:

(1) high density polyethylenic resin having a density of at least 00930 g/cm$^3$, a number of short chain branches per 1,000 carbon atoms of the main chain of not more than 20, and a melt flow rate of at least 0.01 g/10 min;

(2) a linear low density polyethylenic resin having a density of from 0.910 g/cm$^3$ to less than 0.935 g/cm$^3$, a melt flow rate of 0.1 to 50 g/10 min, a melting point as determined by a differential scanning calorimeter (hereinafter abbreviated to "DSC") of 115° to 130° C., and a number of short chain branches per 1,000 carbon atoms of the main chain of 5 to 30;

(3) a modified high density polyethylenic resin obtained by grafting unsaturated carboxylic acid and/or its derivative onto the above high density polyethylenic resin (1); and (4) a modified linear low density pollyethylenic resin obtained by grafting unsaturated carboxylic acid and/or its derivative onto the above linear low density polyethylenic resin (2), said polyethylenic resin containing at least 0.1% by weight of the modified high density polyethylenic resin (3) and/or the modified linear low density polyethylenic resin, (4), and;

(B) 40 to 5% by weight of a linear ultra low density polyethylenic resin having a density of from 0.890 g/cm$^3$ to less than 0.910 g/cm$^3$, a number of short chain branches per 1,000 carbon atoms of the main chain of 18 to 60, a melt flow rate 0.1 to 30 g/10 min, and a melting point as determined by DSC of 110° to 125° C., said resin composition having a density of at least 0.925 g/cm$^3$ and a proportion of unsaturated carboxylic acid and/or its derivative grafted of 0.001 to 5.0% by weight, and a difference in acoustic impedance between the main material layer and the adhesive material layer as determined using a supersonic wave of 20 to 25 MHz is at least $8.5 \times 10^{-3}$ g/cm$^2$·μsec.

BRIEF DESCRIPTION OF DRAWINGS

The symbols indicate the following..

A: Peak from the surface of the main material layer (incident side).

B: Peak from the interface between the main material layer and the adhesive material layer.

C: Peak from the interface between the adhesive material layer and the EVOH or PA layer; and D: Peak from the interface between the EVOH or PA layer and the adhesive material layer (the opposite side of the incident surface).

BEST MODE FOR CARRYING OUT THE INVENTION

Hereinafter the multi-layer laminate molding of the present invention is described in detail. The multi-layer laminate molding of the present invention, as described above, has the layer structure that through at least a specified adhesive material layer, a main material layer containing a polyethylenic resin as a major component at the outside and an EVOH layer or PA layer at the inside are laminated.

(1) Main Material Layer

As the polyethylenic resin to be used as the main component of the main material layer in the present invention, an ethylene homopolymer and a copolymer of ethylene and another α-olefin can be listed. The α-olefin is generally an olefin having 3 to 12 carbon atoms (preferably 3 to 8 carbon atoms). Typical examples of the α-olefin are propylene, butene-1, hexene-1, octene-1, 4-methylpentene-1, and the like.

In the main material layer, only the aforementioned polyethylenic. resin may be used, or a small amount (20% by weight at most) of elastomer or other synthetic resin uniformly compatible with the polyethylenic resin used may be compounded. As the elastomers which can-be used, polyisobutylene, ethylene-propylene, copolymer rubber (EPR), ethylene-propylene-diene terpolymer rubber (EPDM), acrylonitrile-butadiene copolymer rubber (NBR), block or random styrene-butadiene copolymer rubber (SBR), and the like can be listed. As the other synthetic resins, copolymers of ethylene and vinyl acetate, methyl ester, ethyl ester, butyl ester of acrylic acid or methacrylic acid, etc., can be listed. In addition,.different-polymers such as PA, a polyester resin, EVOH and PVC may be compounded within the range that-does not seriously reduce the basic characteristics of the polyethylenic resin as the major component.

In the major material layer, fillers generally added to the aforementioned polyolefinic resin may be added. The amount of addition is preferably adjusted to not more than 30% by weight. As the fillers, calcium carbonate, talc, mica, glass fibers, carbon fibers, metal fibers, other inorganic fibers, and organic polymer fibers (for example, polyester fibers, polyamide fibers) can be listed.

In the present invention, when the elastomer, the other synthetic resin, and the filler are compounded to the aforementioned polyethylenic resin, the amount of these components compounded is such that the total amount is not more than 40% by weight. If the total amount is more than 40% by weight, there occurs unconvenience that moldability and workability, impact resistance, fuel oil resistance, and so forth are reduced.

In the multi-layer laminate molding of the present invention, although the melt flow rate (measured according to JIS-K7210 under condition 4 of Table 1; hereinafter referred to as "MFR") of the polyethylenic resin as the major component of the main material layer is not critical, it is, from a viewpoint of moldabiity and workability, generally at least 0.005 g/10 min, preferably at least 0.01 g/10 mi, and particularly preferably at least 0002 g/10 min.

Preferred among the polyethylenic resin are an ethylenic polymer selected from an ethylene homopolymer and a copolymer of ethylene and α-olefin having a density of at least 0.930 g/cm$^3$, particularly preferably at least 0.935 g/cm$^3$. In addition, there can be used an ethylenic polymer composition having a density of at least 0.930 g/cm$^3$, particularly preferably at least 0.935 g/cm$^3$, as obtained by compounding, to these ethylene homopolymer and copolymer of ethylene and α-olefin, low density polyethylene having a density of less than 0.930 g/cm$^3$ and a copolymer of ethylene and a monomer other than the α-olefin, and a propylene homopolymer and a copolymer of propylene and ethylene or other α-olefin, etc. Of these ethylenic polymers, moderate to high density polyethylene having a density of at least 0.935 g/cm$^3$ is particularly suitable.

(2) Barrier Material Layer

In the present invention, as the barrier material, EVOH or PA is used. EVOH and PA have excellent barrier properties against fuel such as gasoline. EVOH in particular has high barrier properties against alcohol, water and the like.

(a) Layer of Saponified Product of Ethylene-Vinyl Acetate Copolymer (EVOH)

EVOH which can be used, can be produced, for example, by saponifying an ethylene-vinyl acetate-copolymer (EVA) with an alkali and the like. The copolymerization proportion of ethylene in EVA is usually 20 to 80 mol% and particularly preferably 25 to 75 mol%. If the copolymerization proportion of ethylene is less then 20 mol%, moldability and workability are poor. On the other hand, if it is more than 80mol%, the multi-layer laminate molding obtained is not satisfactory in the point of barrier properties against-permeation of gas or liquid. Although the degree of saponification is not critical, it is usually at least 90% and particularly preferably at least 95% from a viewpoint of barrier properties. If the degree of saponification is less than 90%, similarly, the multi-layer laminate molding obtained is not sufficiently high in barrier properties.

Although the molecular weight of EVOH is not critical, the melt flow index (MFI) as measured according to JIS-K7210, condition 4 (190° C., 2.160 g load), is 0.5 to 20 g/10 min and preferably 1 to 10 g/10 min. One type of EVOH may be used, or two or more types of EVOHs may be used in combination. In addition, a polyamide resin or thermoplastic polyvinyl alcohol having compatibility with EVOH can be used in blend with EVOH as long as it does not seriously reduce barrier properties or melt moldability is possible. In particular, blending thermoplastic polyvinyl alcohol with EVOH enables to obtain higher gas and liquid barrier properties.

(b) Polyamide Resin Layer (PA Layer)

As the polyamide resin that can be used, nylon 6, copolymer of nylon 6, modified nylon 6, nylon 11, nylon 12, and nylon 6—6 can be listed. Of these, the one having a melting point at the time of dry of not more than 265° C. is preferred, with the one having a melting point of not more than 235° C. being particularly suitable. These polyamide resins may be used singly or,.as mixtures of two or more thereof. In addition, those obtained by bonding a foil of metal (for example, aluminum, iron, copper) or alloy (for example, stainless steel) to at least on surface of the polyamide resins, and various synthetic films on which the above metal or alloy, or silica is vacuum deposited, so-called metal vacuum deposited films, may be used.

(3) Adhesive Material Layer

In the multi-layer laminate molding of the present invention, the adhesive material layer comprises a resin composition comprising: (A) 60 to 95% by weight of a polyethylenic resin selected from the group consisting of (1) a high density polyethylenic resin having a density of at least 0.930 g/cm$^3$, a number of short chain branches per 1,000 carbon atoms of the main chain of not more than 20, and MFR of at least 0.01 g/10 min, (2) a linear low density polyethylenic resin having a density of from 00910 g/cm$^3$ to less than 0.935 g/cm$^3$, MFR of 0.1 to 50 g/10 min, a melting point as determined by DSC of 115° to 130° C., and a number of short chain branches per 1,000 carbon atoms of the main chain of 5 to 30, (3) a modified high density polyethylenic resin obtained grafting unsaturated carboxylic acid and/or its derivative onto the above high density polyethylenic resin (1), and a modified linear low density polyethylenic resin obtained by grafting unsaturated carboxylic acid and/or its derivative onto the above linear low density polyethylenic resin (2), said polyethylenic resin containing at least 0.1% by weight of the modified high density polyethylenic resin (3) and/or the modified linear low density polyethylenic resin (4), and (B) 40 to 5% by weight of a linear ultra low density polyethylenic resin having a density of from 0.890 g/cm$^3$ to less than 0.910 g/cm$^3$, a number of short chain branches per 1,000 carbon atoms of the main chain of 18 to 60; MFR of 0.1 to 30 g/10 min, and a melting point as determined by DSC of 110° to 125° C., said resin composition having a density of at least 0.925 g/cm$^3$ and a proportion of unsaturated carboxylic acid and/or its derivative grafted of 0.001 to 5.0% by weight.

Hereinafter, "modified" refers to those on which unsaturated carboxylic acid and/or its derivative is grafted, and "unmodified" refers to those not grafted.

The high density polyethylenic resin for the high density polyethylenic resin (1) and the modified high density polyethylenic resin (3) as the component (A) constituting the adhesive material layer is a polyethylenic resin having a density of at least 0.930 g/cm$^3$, a number of short chain branches per 1,000 carbon atoms of the main chain of 20 at most, and MFR of at least 0.01 g/10 mm.

The high density polyethylenic resin is obtained by homopolymerizing or copolymerizing ethylene alone or ethylene and α-olefin having 3 to 12 carbon atoms (preferably 3 to 8 carbon atoms) in the presence of a so-called Phillips catalyst or Ziegler catalyst, and generally produced under a pressure of atmospheric pressure to 100 kg/cm$^2$ (moderate or low pressure polymerization). Preferred examples of the α-olefin propylene, butene-1, hexene-1, 4-methylpentene-1, and octene-1. Its copolymerization ratio is not more than 6.5% by-weight and particularly preferably not more than 6.0% by weight. High density polyethylenic resins may be used singly or two or more thereof may be used in combination.

The density of the high density polyethylenic resin is at least 0.930 g/cm$^3$, preferably at least 0.933 g/cm$^3$, and particularly preferably at least 0.935 g/cm$^3$. Use of the high density polyethylenic resin is excellent in that stiffness, heat resistance, fuel oil resistance, surface hardness, and so forth of the product obtained are increased.

Moreover, MFR is at least 0.01 g/10 min, preferably at least 0.015 g/10 min, and particularly preferably at least 0.02 g/10 min. If HFR is less than 0.01 g/10 min, moldability and workability are inferior. Although the upper limit is not critical, it is usually 50 g/10 min and particularly preferably not more than 35 g/10 min.

In particular, if MFR is less than 0.01 g/10 min, MFR of the grafted high density polyethylenic resin obtained is generally lowered well below the MFR of the high density polyethylenic resin used for graft modification, although depending or graft modification conditions, leading to not only the reduction of moldability and workability, but also serious reduction in compatibility in producing a mixture with an unmodified high density polyethylenic resin, so that no an uniform composition can be obtained. Accordingly, MFR of the modified polyethylenic resin is generally preferred to be at least 0.05 g/10 min. Particularly preferred is at least 0.1 g/10 min.

The linear low density polyethylenic resin (2) used like the above high density polyethylenic resin is the one produced industrially and utilized in a wide variety of fields because it is excellent particularly in environmental stress cracking resistance, transparency, heat-sealability, resistance to brittleness, property at low temperatures and so forth (for example, wrapping materials such as films and industrial materials such as pipes). This linear low density polyethylenic resin is produced by copolymerizing ethylene and the aforementioned α-olefin by the use of a so-called Ziegler catalyst according to any of the gas phase method, the solution method, and the slurry method.

The density of the linear low density polyethylenic resin (2) is from 0.910 g/cm$^3$ to less than 0.935 g/cm$^3$, preferably from 0.0912 g/cm$^3$ to less than 0.935 g/cm$^3$ and particularly preferably from 0.913 g/cm$^3$ to less than 0.935 g/cm$^3$. MFR is from 0.1 to 50 g/10 min, preferably from 0.2 to 40 g/10 min, and particularly preferably from 0.2 to 30 g/10 min. If MFR of the linear low density polyethylenic resin is less than 0.1 g/10 min, moldability and workability are poor. On the other hands if it is more than 50 g/10 min, the composition obtained is poor in mechanical strength.

The melting point as determined by DSC of the linear low density polyethylenic resin is from 115° to 130° C., preferably from 118° to 130° C. and particularly preferably from 118° to 125° C. If the melting point as determined by the DSC method is less than 115° C., long term solvent resistance at high temperatures is low. On the other hand, if it is more than 130° C. the density exceeds the upper limit of the range as described above.

The number of short chain branches per 1,000 carbon atoms of the main chain of the linear low-density polyethylenic resin is from 5 to 30 and particularly preferably from 5 to 25. If the number of short chain branches per 1,000 carbon atoms of the main chain is less than the lower limit, or more than the upper limit, uniformity of the composition of the present invention becomes low in any case, which is not desirable. That is, when there is used a composition using a linear low density polyethylenic resin the number of the branches per 1,000 carbon atoms of the main chain of which is outside the aforementioned range, in the evaluation of long term solvent resistance (for example, fuel oil resistance) in particular, the decrease of tensile elongation is large, and moreover, under conditions that heat resistance is added (more specifically, durability test in an atmosphere of at least 100° C.), the decrease of physical properties additionally occurs, both are considered due to the ununiformity of the composition.

The modified polyethylenic resins used as the component (A) in the present invention (i.e., the modified high density polyethylenic resin (3) and the modified linear low density polyethylenic resin (4)) are obtained by grafting the unsaturated carboxylic acid and/or its derivative as described hereinafter onto the high density polyethylenic resin and/or linear low density polyethylenic resin as described above. This graft reaction is performed in the presence of a radical initiator. In this case, synthetic resins and elastomers (rubber) as described hereinafter, having affinity respectively to the high density polyethylenic resin and linear low density polyethylenic resin to be grafted, may be allowed to be present. This reaction can be performed by known methods, for example, the methods described in Japanese Patent Application Laid-Open Nos. 10107/1987 and 132345/1986.

As unsaturated carboxylic acid and its derivatives for use in the graft treatment in the present invention, monobasic unsaturated carboxylic acid and dibesic unsaturated carboxylic acid, and their metal salts, amides, imides, esters and anhydrides are listed. Of these, as the monobasic unsaturated carboxylic acid and its derivatives, those having 20 or less carbon atoms are generally preferred, with those having 15 or less carbon atoms being more preferred. In addition, as the dibasic unsaturated carboxylic acid and its derivatives, those having 30 or less carbon atoms are usually preferred, with those having 25 or less carbon atoms being more preferred. Typical examples of these unsaturated carboxylic acids and derivatives thereof are described in Japanese Patent Application Laid-Open No 10107/1987. Of these unsaturated carboxylic acids and derivatives thereof, acrylic acid, methacrylic acid, maleic acid and its anhydride, 5-norbornen-2, 3-dicarboxylic acid and its anhydride, and glycidyl methacrylate are preferred, with maleic anhydride and 5-norbornic anhydride being particularly preferred.

The amount of the unsaturated-carboxylic-acid and its derivative used in the graft modification is generally 0.01 to 5.0 parts by weight, preferably 0.01 to 3.0 parts by weight, and particularly preferably 0.02 to 2.0 parts by weight, per 100 parts by weight of the polyethylenic resin to be grafted. If the proportion of the unsaturated carboxylic acid and its derivative is less than 0.01 part by weight as the total amount thereof, graft modification is conducted only insufficiently, and a problem arises in affinity or adhesive properties aimed at by the present invention. On the other hand, if it is more than 5.0 parts by weight, there is a risk that the graft modified high density polyethylenic resin and graft modified linear low density polyethylenic resin as obtained undergo gelation, coloration, deterioration and so forth; the increase of performance aimed at by the present invention is not observed.

As the radical initiator, those having a decomposition temperature for the one-minute half life period of 100° C. or more are usually used, with those of 103° C. or more being preferred and those of 105° C. or more being particularly preferred. Suitable radical initiators include organic peroxides such as dicumyl peroxide; benzoyl peroxide, di-tertbutyl peroxide; 2,5-dimethyl-2,5-di(tert-butylperoxy) hexane; 2,5-dimethyl-2,5-di(tert-butylperoxy) hexane-3; lauroyl peroxide; and tert-butylperoxy benzoate. The proportion of the radical initiator is usually 0.001 part by weight, preferably 0.005 to 1.0 part by weight, and particularly preferably 0.005 to 0.5 part by weight, per 100 parts by weight of the polyethylenic resin to be grafted. If the proportion of the radical initiator is less than 0.001 part by weight, the effect of graft modification is exhibited only insufficiently, resulting in that not only a long time is needed for complete graft modification but also unreacted materials are present in admixture. On the other hand, if it is more than 1.0 part by weight, excessive decomposition or crosslinking reaction undesirably occurs.

Olefinic resins which can be allowed to coexist at the time of the above graft reaction, include a high-pressure-process low density polyethylenic resin and copolymers of ethylene and other vinyl monomers, such as an ethylene-vinyl acetate copolymer, an ethylene-acrylic acid copolymer, an ethylene-methacrylic acid copolymer, an ethylene-methyl acrylate copolymer, an ethylene-ethyl acrylate copolymer, an ethylene-butyl acrylate copolymer, and an ethylene-methyl methacrylate copolymer. As the elastomer, synthetic and natural rubbers, such as ethylene-α-olefin copolymer rubber, e.g., ethylene-propylene copolymer rubber, ethylene-propylene-diene terpolymer rubber, and ethylene-butene-1 copolymer rubber, polyisobutylene rubber, polyurethane rubber, styrene-butadiene copolymer rubber, and polybutadiene rubber can be listed. These are generally used in an amount of not more than 10% by weight in the polyethylenic resin to be grafted, with the amount of not more than 5.0% by weight being particularly preferred. If the proportion, as total amount, of the olefinic resin and/or the elastomer in the total amount of the high density polyethylenic resin and/or the linear low density polyethylanic resin is more than 10% by weight, the basic characteristics of the high-density polyethylenic resin and/or the linear low density polyethylenic resin are sometimes deteriorated.

The modified polyethylenic resins to be used as the component (A) in the present invention (i.e., the modified high density polyethylanic resin (3) and the modified linear low density polyethylanic resin (4)) are obtained by grafting the unsaturated carboxylic acid and/or its derivative as described hereinafter onto the high density polyethylenic resin and/or the linear low density polyethylanic resin as described above. This graft reaction is performed in the presence of a radical initiator. At this time, the synthetic resin and elastomer (rubber) as described hereinafter having affinity respectively to the high density polyethylenic resin and the linear low density polyethylenic resin to be grafted, may be present. This method can be performed by known methods, for example, the methods described in Japanese Patent Application Laid-Open Nos. 10107/1987 and 132345/1986.

As the reaction, a method in which the high density polyethylenic resin, etc. a to be processed by the use of an extruder, a Bumbury mixer, a kneader and the like, is kneaded in a molten state, a solution method in which polymers such as the high density polyethylenic resin and the linear low density polyethylenic resin are dissolved in a suitable solvent, a slurry method in which particles of polymers such as the high density polyethylenic resin are conducted in a suspension state, or a gas phase graft method is listed.

The reaction temperature is selected appropriately taking into consideration the deterioration of polymers such as the high density polyethylenic resin and the linear low density polyethylenic resin, the decomposition of the unsaturated carboxylic acid and its derivative, the decomposition temperature of the radical initiator to be used, and so forth. To take the above method of kneading in a molten state as an example, the reaction temperature is usually 100° to 350° C. and preferably 150° to 300° C. Particularly preferred is 180° to 300° C.

In this manner, of course, the modified high density polyethylenic resin and the modified linear low density polyethylenic resin of the present invention are produced. For the purpose of increasing the performance, already known processing methods such as the method described in Japanese Patent Application Laid-Open No. 10107/1987, for example, a method in which treatment with an epoxy compound or a polyfunctional compound containing an amino group or a hydroxyl group, for example, is applied at the time of graft modification or after the graft modification, and further a method in which unreacted monomers (unsaturated carboxylic acid and its derivative) and various components by-produced are removed by heating washing and so forth, can be employed.

In the multi-layer laminate molding of the present invention, it is necessary that the adhesive material layer contain the linear ultra low density polyethylenic resin as the component (B). A method of production of this linear super low density polyethylenic resin-is widely known, and in recent years, it is industrially produced by an improved slurry polymerization method or the gas phase polymerization method, for example, and widely utilized.

Accordingly, unlike conventionally known ethylene-α-olefin random coplymers (density 0.86 to 0.91 g/cm$^3$) of low crystallinity, having a degree of crystllization of several percents to about 30%, as obtained by polymerizing by the use of a vanadium catalyst system, it is a linear ultra low density polyethylenic resin produced according to the slurry method or the gas phase method by the use of a stereo-regular catalyst (so-called Ziegler catalyst) as described in, for example, Japanese Patent Application Laid-Open Nos. 68306/1982, 23011/1984 and 109805/1986.

The linear ultra low density polyethylenic resin of the component (B) is a linear ultra low density polyethylenic resin-having a density of from 0.890 g/cm$^3$ to less than 0.910 g/cm$^3$, MFR of 0.1 to 30 g/10 min, a melting point as determined by DSC of 110° to 125° C., and a number of short chain branches per 1,000 carbon atoms of the main chain of 18 to 60.

In the present invention, if the density of the above resin is less than 00890 g/cm$^3$, a problem arises in the fuel oil resistance of the composition obtained. On the other hand, if it is more than 0.910 g/cm$^3$, the composition obtained is insufficient in impact resistance. For these reasons, the density is preferably 0.890 to 0.0910 g/cm$^3$. If the MFR of the above resin is less than 0.1 g/10 min, moldability and workability are not desirable, and if it is more than 30 g/10 min, a problem arises, in respect of impact resistance. For these reasons, it is desirable that MFR be 0.1 to 10 g/10 min, with 0.2 to 8.0 g /10 min being particularly preferred.

Furthermore, the melting point shown by DSC (about 5 mg of a sample is weighed, set on a DSC measuring apparatus, raised in temperature up to 200° C. from room temperature at a temperature-raising rate of 10° C./min, maintained at that temperature for 5 minutes, lowered in temperature to room temperature at a temperature-lowering rate of 10° C./min, and further raised in temperature at the above temperature-raising rate; the temperature of a peak of the maximum heat absorption region is referred to as a "melting point") is 110° to 125° C. Particularly preferred are those of 112° to 125° C. If the melting point is less than 110° C,. the composition obtained is not sufficiently high in heat resistance, and if it is more than 125° C., the effect of improving impact resistance is poor.

The number of short chain branches per 1,000 carbon atoms of the main chain of the above resin is 18 to 60, preferably 18 to 50 and particularly preferably 20 to 50. If the number of short chain branches per 1,000 carbon atoms of the main chain is less than 18, the multi-layer laminate molding has a problem in respect of impact resistance, and if it is more than 60, fuel oil resistance is considerably inferior. The short chain as used herein refers to the one substantially, comprising an alkyl group having 1 to 10, preferably 1 to 6 carbon atoms.

In addition, from a viewpoint of the effect of improving impact resistance, the initial modulus in tension of the above polyethylenic resin is not more than $2\times10^3$ kg/cm$^2$, and preferably not more than $1.5\times10^3$ kg/cm$^2$. Such polyethylenic resins are obtained by copolymerizing ethylene and the aforementioned α-olefin by the use of a Ziegler catalyst.

For the resin composition constituting the adhesive material layer in the present invention is required that the above component (A) contains at least 0.1% by weight of the modified high density polyethylenic resin and/or the modified linear low density polyethylenic resin. If the content of the total modified polyethylenic resin is less than 0.1% by weight, there cannot be obtained an adhesive material aimed at by the present invention, satisfying affinity or adhesive properties to the aforementioned resin materials and metal materials, and so forth. The content of the modified polyethylenic resin is preferably at least 1.0% by weight, and particularly preferably at least2.5%. by weight.

The resin composition constituting the adhesive material layer in the present invention comprises the aforementioned components (A) and (B) and in connection with their compounding proportions, the component (A) is 60 to 95% by weight and the component (B) is 40 to 5% by weight, preferably the component (A) is 62 to 95% by weight and the component (B) is 38 to 5% by weight, and particularly preferably the component (A) is 62 to 93% by weight and the component (B) is 38 to 7% by weight. If the proportion of the linear ultra low density polyethylenic resin in the composition is less than 5.0% by weight, the laminate structure material obtained is inferior in impact resistance, and if it is more than 40% by weight, fuel oil resistance (particularly fuel oil resistance at 40° C.) is significantly decreased, which is not desirable.

The resin composition constituting the adhesive material layer in the present invention may contain, as well as the aforementioned components (A) and (B), an unmodified high density polyethylenic resin and/or an unmodified linear low density polyethylenic resin. That is, in general, in graft modification of a polymer (in the present invention, the high density polyethylenic resin or linear low density polyethylenic resin) with a monomer (in the present invention, the unsaturated carboxylic acid and its derivative), it is difficult that all polymers are grafted; part of the polymers remain ungrafted. In the present invention, high density polyethylenic resins or linear low density polyethylenic resins which are not grafted, may be used as such without isolation. In addition, unmodified high density polyethylenic resins and/or linear low density polyethylenic resins which are not subjected-to graft treatment may be compounded.

In the present invention, when the unmodified high density polyethylenic resin (1) is added, the amount of use thereof is preferably not more than 99.9% by weight of the component (A), with not more than 99.0% by weight being particularly preferred. If the proportion of the unmodified high density polyethylenic resin (1) is more than 99.9% by weight, adhesive properties are not sufficiently high.

When the unmodified linear low density polyethylenic resin (2) is added, the amount of use thereof is preferably 2.5 to 75% by weight of the component (A), with 5.0 to 60% by weight being particularly preferred. If the proportion of the unmodified linear low density polyethylenic resin (2) is less than 2.5% by weight, uniformity of the composition in the total composition is inferior On the other hand, if it is more than 75% by weight, heat resistance and long term fuel oil resistance at high temperatures are inferior.

With the resin composition constituting the adhesive material layer in the present invention, some of all components of the composition may be mixed in advance and the remaining components be mixed, or all components of the composition may be mixed at the same time. In any case, the proportion of the grafted monomer (unsaturated carboxylic acid and/or its derivative) in the adhesive material in the present invention is, as the total amount thereof, 0.01 to 5.0% by weight, preferably 0.01 to 2.0%. by weight, and particularly preferably 0.02 to 1.0% by weight. If the proportion of the grafted monomer occupying in the adhesive material is, as the total amount thereof, less than 0.001% by weight, various effects of the present invention cannot be exhibited sufficiently. On the other hand, even if it is mores than 5.0% by weight, no further improvement in the effects of the present invention can be obtained.

The composition of the resin composition constituting the adhesive material layer in the present invention is required to satisfy the aforementioned various conditions and at the same time, to be chosen so that the density of the adhesive material is at least 0.925 g/cm$^3$, and the difference in acoustic impedance between the main material layer and adhesive material layer as determined using a supersonic wave of 20 to 25 MHz is at least $8.5\times10^{-3}$g/cm$^2$·μsec. The density of the adhesive material is necessary to be at least 0.925 g/cm$^3$, with at least 0.926 g/cm$^3$ being particularly preferred. If the density of the adhesive material is less than 0.925 g/cm$^3$, long term solvent resistance is not good.

The acoustic impedance (hereinafter referred to as "$Z_1$") of the adhesive material layer is at least $1.980'10^{-1}$/cm$^2$·μsec, preferably at least $1.982\times10^{-1}$g/cm$^2$·μsec, and particularly preferably at least $1.984\times10^{-1}$g/cm$^2$ μsec. If $Z_1$ is less than $1.980\times10^{-1}$ g/cm$^2$·μsec, fuel oil resistance, heat resistance and so forth are not sufficiently high.

On the other hand, although the acoustic impedance ($Z_O$) of the main material layer is not critical, it is, as determined using a supersonic wave of 20 to 25 MHz, preferably at least about $2.00\times10^{-1}$g/cm$^2$·μsec, desirably at least $2.10\times10^{-1}$ g/cm$^2$ ·μsec, and particularly preferably at least $2.20\times10^{-1}$g/cm$^2$·μsec.

However, in order that the presence or absence of the adhesive material layer can be detected by the non-destructive method, the acoustic impedance difference $|Z_O-Z_1|$ between the main material layer and adhesive material layer is at least $8.5\times10^{-3}$ g/cm$^2$·μsec, preferably at least $9.0\times10^{-3}$ g/cm$^2$·μsec, and particularly preferably at least $9.5\times10^{-3}$ g/cm$^2$·μsec. That is, when $Z_O$ is $2.20\times10^{-1}$ g/cm$^2$·μsec, $Z_1$ is not more than $2.115\times10$ g/cm$^2$·μsec, and when $Z_O$ is $2.00\times10^{-1}$ g/cm$^2$·μsec, $Z_1$ is not more than $1.915\times10^{-3}$ g/cm$^2$·μsec. If the acoustic impedance difference between the main material layer and adhesive material layer is less than $8.5\times10^{-3}$ g/cm$^2$ ·μsec, it becomes quite difficult to achieve supersonic wave detection of the presence or absence of the adhesive material layer in a non-destructive state.

In preparation of each composition of the present invention, additives such as an antioxidant, a thermal stabilizer, an ultraviolet absorber, a lubricant, an antistatic agent, and a pigment (colorant) which are commonly used in the field of polyolefinic resins, can be compounded within the range that does not substantially damage the effects of the composition.

As the mixing method for preparation of the composition, any of various mixing methods commonly employed in the field of synthetic resins, i.e., a method in which dry blending is carried out by the use of a mixer such as a tumbler or a Henschel mixer, and a method in which melt kneading is carried out by the use of a kneader such as an extruder, a kneader, a Bumbury mixer and a roll, can be employed. At this time, by carrying out two or more of these mixing methods, a more uniform composition can be obtained (for example, a method in which dry blending is conducted in advance, and the mixture thus obtained is further melt kneaded).

In accordance with the-present invention, the multi-layer laminate molding of the present invention can be produced by laminating the main material and EVOH or PA through the aforementioned adhesive material layer (3) by a method commonly employed in the field of synthetic resin, and further molding into a desired shape. Lamination can be carried out by a method in which the main material, adhesive material and EVOH or PA are coextruded by the use of three or more extruders (for example, multi-layer blow, coextrusion inflation, and T-die film molding), a method in which EVOH or PA is used as a substrate, and the main material and adhesive material are coextruded thereon and coated (coating or lamination), and a method of heat contact-bonding. In addition, a method in which the materials are separately molded into films or sheets, and they are subjected to heat contact-bonding, is available.

In connection with the layer structure of the laminate for the multi-layer laminate molding of the present invention, assuming that the main material layer is A, the adhesive material layer is B, and the EVOH or PA layer is C, there are A/B/C, A/B/C/B, A/B/C/B/A, or structures that these structures are repeated; and furthermore, assuming that other barrier material layer is D, the layer D may be provided between the layer B and the layer C, and further, if necessary, the layer B may be sandwiched between the layer C and the layer D.

In the present invention, it suffices to be determined depending on desired physical properties of the objective molding and taking into consideration the characteristics of the resins which of the EVOH layer and the PA layer is used as the barrier material layer C. If necessary, EVOH and PA layers may be used in combination.

In order to effectively utilize flashes produced at the time of product molding, they are commonly finely pulverized and, if necessary to make the composition uniform, melt kneaded by the use of an extruder and so forth, and recycled mainly for use in the main material layer, or there may be employed a layer structure that a fresh recycle layer E is provided at the outside of the layer A and between the layer A and layer B, such as A/E/B/C or E/A/B/C.

In the present invention, when a container particularly for fuel oil or edible oil and so forth is produced, a method is typical in which blow molding is carried out by the use of a multi-layer blow molding machine provided with extruders adapted to coextrude the main material, EVOH or PA and the adhesive material in such a manner that the adhesive material is sandwiched between the main material and EVOH or PA, and further with a multi-layer die (in a cocentric circular form). The above blow molding method is described in detail in Japanese Patent Application Laid-Open No. 104707/1987, "Polymer Digest" March, 1988 (Vol. 40, No. 3, pages 33 to 42), and "Plastics Age" March, 1989, pages 129 to 136.

In connection with the structure when the molding is a fuel oil container, assuming that the main material layer is A the adhesive-material layer is B, the EVOH or PA layer is, C, there are A/B/C, A/B/C/B, and A/B/C/B/A, or structures that these structures are repeated, and assuming that the other barrier material layer is D, the layer D may be provided between the layer B and layer C, and further, if necessary, another layer B may be provided between the layer C and the layer D, or the layer D may be provided at the outside of A and B, as in D/B/A/B/C and A/B/C/B/D. Of course, combinations of these (for example, D/B/A/D/B/C) may be used.

In the molding of the present invention, the thicknesses of the main material layer, adhesive material layer and EVOH or PA layer are determined appropriately depending on performance required for the desired molding, performance of the molding machine, and application of use, shape, the type of the composition used and so forth. Particularly in containers for fuel oil or edible oil and so forth, in general, the thicknesses of the adhesive material layer and the EVOH or PA layer are each several micrometers to 3 mm, preferably 10 μm to 2 mm and particularly preferably 10 μm to 1 mm. The thickness of the main material layer is 0.3 to 10 mm, with 0.5 to 7 mm being particularly preferred.

It is possible that flashes resulting from the production of the container thus obtained are ground by the use of a grinder and so forth and then finely divided by the use of an extruder, for example, so that the size of EVOH or PA is not more than about 100 μm and, thereafter, they are used in admixture with the main material in about 5 to 50%. In this case, however, it must be-confirmed in advance that as compared with the case that no flash is used, the fuel oil container obtained is not inferior in respect of performance and long term durability, that is, there is no problem in the practical use thereof.

In any of the case that melt kneading is carried out for production of the aforementioned adhesive material in the present invention and the case that lamination is carried out for the production of the multi-layer laminate molding, they are necessary to be carried out at temperatures at which various polyethylenic resins, synthetic resins, elastomers, EVOH and PA melt. If, however, they are carried out at high temperatures, they sometimes undergo heat decomposition. For the above reasons, in general, they are carried out at 170° to 280° C. and preferably 190° to 250° C.

The present invention is explained in greater detail with reference to Examples and Comparative Examples.
Examples 1 to 12 and Comparative Examples 1 to 9
(1) Production of Modified Polyethylene Various modified polyethylenic resins used as an adhesive material component in the examples and comparative examples were produced as follow. The polyethylenic resin is abbreviated to "PE".
Modified PE (a)

To powdered high density PE (hereinafter referred to as "HDPE") having a density of 0.952 g/cm$^3$ and MFR=0.93 g/10 min was added 0.012 part by weight of 2,5-dimethyl-2,5-tert-butyl-peroxyhexane as a radical initiator, which were then dry blended for 2 minutes by the use of a Henschel mixer and, thereafter, 0.375 part by weight of maleic anhydride (hereinafter referred to as "MAH") was added thereto, and the mixture was dry blended for 2-minutes, by the use of a Henschel mixer, melt kneaded at a resin temperature of 257° C. and pelletized. The amount of MAH grafted in the modified PE (a) thus obtained was 0.33% by weight as determined by the infrared ray spectral method.

Modified PE (b)

To powdered HDPE (2) having a density of 0.945 g/cm³ and MFR=0.44 g/10 min was added 0.012 part by weight of 2,5-dimethyl-2,5-tert -butylperoxyhexane as a radical initiator, which were then dry blended for 2 minutes by the use of a Henschel mixer and, thereafter, 0.375 par t by weight of MAH was added thereto, and the mixture was dry blended for additional 2 minutes by the use of a Henschel mixer, malt kneaded at a resin temperature of 260° C. and pelletized. The amount of MAH grafted in the modified PE (b) thus obtained was 0.32% by weight as determined by the infrared ray spectral method.

Modified PE (c).

To linear low density PE (hereinafter referred to as "LLDPE") (LLDPE(3)) having a density of 0.925 g/cm³, MFR=0.78 g/10 min, melting point=120.5° C. and a number of branching of 9.5/1000 C was added 0.012 part by weight of 2,5-dimethyl-2,5-tert-butylperoxyhexane as a radical initiator, which were then dry blended for 2 minutes by the use of a Henschel mixer and, thereafter, 0.375 part by weight of MAH was added and the mixture was dry blended for additional 2 minutes by the use of a Henschel mixer, melt kneaded at a resin temperature of 255° C. and pelletized. The amount of MAH grafted in the modified PE (c) thus obtained was 0.30% by weight as determined by the infrared ray spectral method.

Modified PE (d)

To LLDPE (4) having a density of 0.900 g/cm³, MFR=4.0 g/10 m, melting point=98° C. and a number of branching of 72/1000 C was added 0.012 part by weight of 2,5-dimethyl-2,5-tert-butylperoxyhexane as a radical initiator, which were then dry blended for 2 minutes by the use of a Henschel mixer and, thereafter, 0.375 part by weight of MAH was added thereto, and the mixture was dry blended for additional 2 minutes by the use of a Henschel mixer, melt kneaded at a resin temperature of 232° C. and pelletized. The amount of MAH grafted in the modified PE (d) thus obtained was 0.26% by weight as determined by the infrared ray spectral method.

Characteristics of the unmodified linear ultra low density PE (hereinafter referred to as "L-ULDPE") used likewise are as follow:

L-ULDPE (5)

Having a density of 0.904 g/cm³, MFR=1.0 g/10 min, melting point=−120° C. and a number of branching of 28/1000 C as produced by the slurry polymerization method.

L-ULDPE (6)

Having a density of 0.897 g/cm³, MFR==0.7 g/10 min, melting point=115° C. and a number of branching of 47/1000 C as produced by the slurry polymerization method.

L-ULDPE (7)

Having a density of 0.907 g/cm³, MFR=6.5 g/10 min, melting point=121° C. and a number of branching of 21/1000 C as produced by the slurry polymerization method.

L-ULDPE (8)

Having a density of 0.900 g/cm³, MFR=4.0 g/10 min, melting point=98° C. and a number of branching of 72/1000 C as produced by the solution polymerization method.

(2) Production of Adhesive Material

The aforementioned modified polyethylenic resin (modified PE), unmodified polyethylenic resin (unmodified PE) and unmodified linear ultra low density polyethylenic resin (L-ULDPE) were mixed in the ratios shown in Tables 1 and 2, and melt kneaded at a temperature of 200° to 220° C. by the use of a single screw extruder having a diameter of 50 mm to produce adhesive materials (1) to (16) shown in Tables 1 and 2.

The density ($\rho$) of the adhesive obtained was measured according to JIS-K7112 method and with regard to the acoustic impedance (Z), a supersonic thickness meter produced by Nippon Panametrics Co., Ltd, which was provided with a vertical depth sensor having a piezo element as an oscillating plate, was used, the speed of sound (c) when a supersonic wave having a frequency of 20 MHz was hit on a press plate (30 mm×30 mm) of 2 mm thickness in the direction of thickness, was measured, and the acoustic impedance was calculated from the following equation:

$$Z \rho \times c (g/cm^2 \cdot \mu sec)$$

TABLE 1

| Adhesive Material | Modified PE | | Unmodified PE | | L-ULDPE | | Characteristics of Adhesive Material | |
|---|---|---|---|---|---|---|---|---|
| | Type | Amount (wt %) | Type | Amount (wt %) | Type | Amount (wt %) | Density (g/cm³) | $Z_1$ (g/cm² · $\mu$sec) |
| (1) | (a) | 80 | — | | L-ULDPE (6) | 20 | 0.940 | 2.115 × 10⁻¹ |
| (2) | (a) | 65 | — | | L-ULDPE (6) | 35 | 0.934 | 2.050 × 10⁻¹ |
| (3) | (a) | 35 | LLDPE (3) | 55 | L-ULDPE (5) | 10 | 0.930 | 2.021 × 10⁻¹ |
| (4) | (a) | 35 | LLDPE (3) | 45 | L-ULDPE (5) | 20 | 0.929 | 2.015 × 10⁻¹ |
| (5) | (a) | 35 | LLDPE (3) | 35 | L-ULDPE (5) | 30 | 0.927 | 2.003 × 10⁻¹ |
| (6) | (b) | 30 | HDPE (1) | 45 | L-ULDPE (7) | 25 | 0.937 | 2.084 × 10⁻¹ |
| (7) | (a) | 50 | LLDPE (3) | 15 | L-ULDPE (5) | 25 | 0.932 | 2.032 × 10⁻¹ |
| | (c) | 10 | | | | | | |
| (8) | (a) | 20 | HDPE (1) | 40 | L-ULDPE (5) | 30 | 0.934 | 2.049 × 10⁻¹ |
| | (c) | 10 | | | | | | |
| (9) | (a) | 25 | HDPE (1) | 25 | L-ULDPE (5) | 20 | 0.933 | 2.037 × 10⁻¹ |
| | (c) | 15 | LLDPE (3) | 15 | | | | |

TABLE 2

| Adhesive Material | Modified PE | | Unmodified PE | | L-ULDPE | | Characteristics of Adhesive Material | |
|---|---|---|---|---|---|---|---|---|
| | Type | Amount (wt %) | Type | Amount (wt %) | Type | Amount (wt %) | Density (g/cm³) | $Z_1$ (g/cm²·μsec) |
| (10) | (a) | 97.5 | — | | L-ULDPE (6) | 2.5 | 0.948 | $2.258 \times 10^{-1}$ |
| (11) | (a) | 50 | — | | L-ULDPE (6) | 50 | 0.923 | $1.939 \times 10^{-1}$ |
| (12) | (b) | 10 | HDPE (1) | 80 | L-ULDPE (5) | 10 | 0.945 | $2.217 \times 10^{-1}$ |
| (13) | (a) | 75 | LLDPE (3) | 10 | L-ULDPE (7) | 15 | 0.941 | $2.165 \times 10^{-1}$ |
| (14) | (a) | 30 | LLDPE (3) | 10 | L-ULDPE (6) | 60 | 0.915 | $1.870 \times 10^{-1}$ |
| (15) | (d) | 25 | HDPE (1) | 60 | L-ULDPE (5) | 15 | 0.930 | $2.019 \times 10^{-1}$ |
| (16) | (a) | 50 | LLDPE (3) | 20 | L-ULDPE (8) | 30 | 0.925 | $2.013 \times 10^{-1}$ |

(3) Production of Multi-Layer Laminate

As shown in Tables 3 and 4, using the aforementioned adhesive materials (1) to (16) as the adhesive material, and as the main material, HDPE (A) having high load melt index (measured according to JIS-K7210 under condition 7 of Table 1; hereinafter abbreviated to "HLMFR")=4.8 g/10 min, density=0.945 g/cm³ and acoustic impedance ($Z_0$)= $2.23 \times 10^{-1}$ g/cm²·μsec, or HDPE (B) having MFR=0.3 g/10 min, density=0.948 g/cm³ and $Z_0 = 2.26 \times 10^{-1}$ g/cm²·μsec, and additionally, as the EVOH, EVOH having an ethylene content of 29 mol%, a melting point as determined by the DSC method of 189° C., MFR=4 g/10 min at 230° C. and a density of 1.20 g/cm³, molding of 3-type 5-layer multi-layer laminates (molding temperature 210° C., thickness construction, each main material layer 1.5 mm, each adhesive material layer 0.10 mm, EVOH layer 0.08 mm) was conducted.

From the flat portion of the-above laminate was obtained a multi-layer-piece having a width of 10 mm and a length of 150 mm, which was then measured for the initial adhesive strength $P_0$ between the adhesive material layer and, the EVOH layer according to the T type peeling method by the use of a tension type tensile tester under condition of peeling speed of 50 mm/min, with the results shown in Tables 3 and 4.

The same multi-layer piece was allowed to stand for 96 hours in an oven at 115° C. and then dipped for 1,000 hours in a mixed solution consisting of 90% by volume of commercially available regular gasoline and 10% by volume of methanol at 40° C. and, thereafter, after adjustment of condition for more than 50 hours in an atmosphere of 23° C. and 50%RH, was measured for adhesive strength $P_1$, under the same conditions. By comparison with $P_0$ for evaluation of long term heat resistance and fuel oil resistance, the degree of retention of adhesive strength (value of $P_1$ with $P_0$ as 100) was determined, and the evaluation is shown in Tables 3 and 4.

Figure 1:
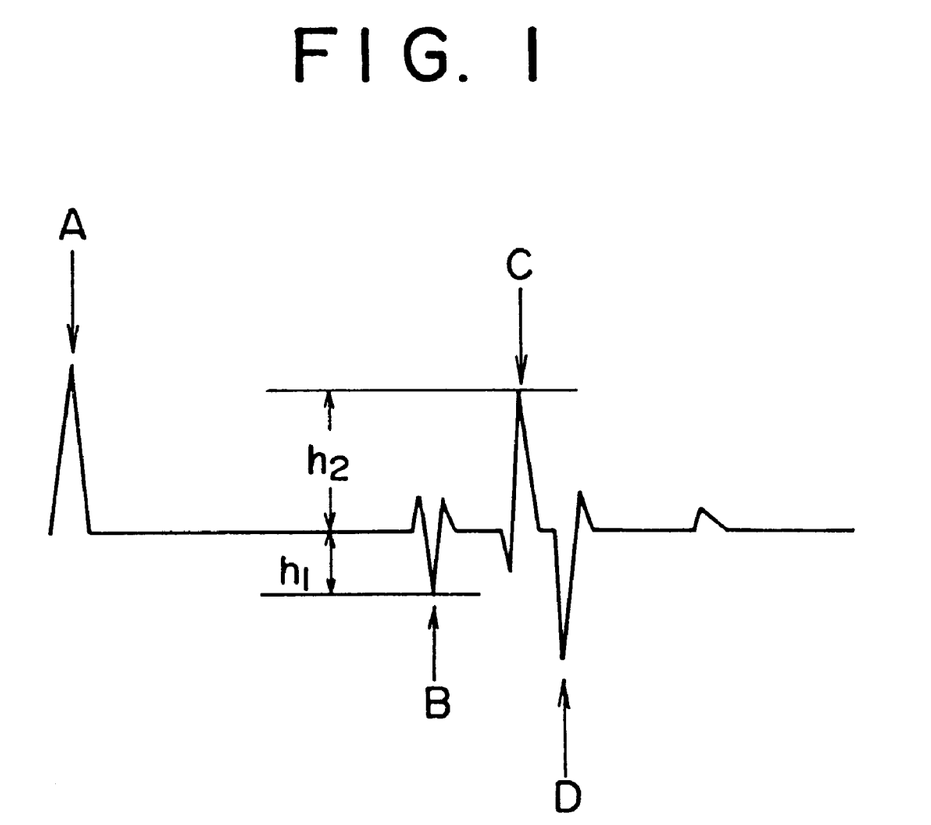
FIG. 1 shows a model of pulse wave form obtained when a supersonic wave was incident of a 3-type 5-layer multi-layer laminate molding from the side of the main material layer, and reflected pulse from each interface of the incident 3 layers is output on an oscilloscope for observation of wave form.

Moreover, determination of detectability of the adhesive material was conducted by the following method. That is, the aforementioned apparatus used in measurement of acoustic impedance was used, a supersonic wave (freguency 20 MHz) was hit on each multi-layer laminate sheet, and pulse waves reflected from the respective interfaces were put-out on an osciloscope for observation of wave form, as provided with a polaroid camera for recording, and the pulse waves were recorded by the use of the camera. A model of record is shown in FIG. 1. FIG. 1 shows a pulse wave form of pulses reflected from the respective interfaces, as output on the osciloscope for observation, when a supersonic wave was hit on the 3-type 5-layer multi-layer laminate-sheet from one main material layer side. Explaining, in more detail, the ordinate axis indicates the intensity of reflected wave, and the abscissa axis indicates a distance in the direction of thickness from one surface of the multi-layer laminate sheet. The pulse input from the left side of FIG. 1 shows a reflected wave intensity peak indicated by (A) on the surface of the main material layer, and then part of the pulse enters the laminate constituting material wall, passing through the thickness of the main material layer corresponding to the distance between peak A and Peak B, and reflected at the surface of the adhesive material layer (interface between the adhesive material layer and main material layer) as indicated by peak B.

In FIG. 1, peaks A and B are in the opposite direction, which indicates that the acoustic impedance ($Z_1$) of the adhesive material layer is lower than that ($Z_0$) of the main material layer ($Z_0 > Z_1$); naturally, if $Z_1 > Z_0$, the peaks are in the same direction.

Then, further part of the pulse, after passing through the thickness of the adhesive material layer (distance between peak B and peak C), is reflected at the interface between the adhesive material layer and EVOH layer as indicated by peak C. After passage through the EVOH layer (distance between peak C and peak D), it is reflected as indicated by peak D.

When this measuring method is employed, assuming that the difference between the intensity peak of the reflected wave of the main material layer and the intensity peak of the reflected wave of the adhesive material layer is $h_1$, and the difference between the peak of the main material layer and the peak of the EVOH layer is $h_2$, if $h_1/h_2$ is less than 0.08, it is judged as "not detectable", and if $h_1/h_2$ is 0.095 or more, it is judged as "detectable". The reason for this is that if $h_1/h_2$ is less than 0.095, it becomes quite difficult to distinguish the peak from the interface between the main material layer and adhesive material layer, over the disturbance of wave form due to noise.

The symbols shown behind the figures of $h_1/h_2$ in Tables 3 and 4 indicates detectability as evaluated on the following criteria:

⊚: Greatly well detectable o: Well detectable

Δ: Detectable x: Detectable only with difficulty

TABLE 3

|  | Main Material | Adhesive Material | Initial Adhesive Strength (kg/cm) | Degree of Retention of Adhesive Strength (%) | Difference in Acoustic Impedance (g/cm$^2$ · μsec) | $h_1/h_2$ (Detectability) |
|---|---|---|---|---|---|---|
| Example 1 | HDPE (A) | (1) | ≧13.5* | 89 | 13.5 × 10$^{-3}$ | 0.10 (◯) |
| Example 2 | HDPE (A) | (2) | ≧15* | 93 | 18.0 × 10$^{-3}$ | 0.12 (◎) |
| Example 3 | HDPE (A) | (3) | ≧16* | 92 | 20.9 × 10$^{-3}$ | 0.12 (◎) |
| Example 4 | HDPE (A) | (4) | ≧19.5* | 100 | 21.5 × 10$^{-3}$ | 0.12 (◎) |
| Example 5 | HDPE (A) | (5) | no peeling | 100 | 22.7 × 10$^{-3}$ | 0.13 (◎) |
| Example 6 | HDPE (A) | (6) | no peeling | 100 | 14.6 × 10$^{-3}$ | 0.11 (◯) |
| Example 7 | HDPE (A) | (7) | no peeling | 100 | 19.8 × 10$^{-3}$ | 0.12 (◎) |
| Example 8 | HDPE (A) | (8) | no peeling | 100 | 18.1 × 10$^{-3}$ | 0.11 (◯) |
| Example 9 | HDPE (A) | (9) | no peeling | 100 | 19.3 × 10$^{-3}$ | 0.12 (◎) |
| Example 10 | HDPE (B) | (8) | ≧18* | 98 | 9.5 × 10$^{-3}$ | 0.09 (Δ) |
| Example 11 | HDPE (B) | (6) | no peeling | 100 | 17.6 × 10$^{-3}$ | 0.11 (◯) |
| Example 12 | HDPE (B) | (5) | no peeling | 100 | 25.7 × 10$^{-3}$ | 0.14 (◎) |

*indicates cutting of the layer comprising the main material layer and adhesive material layer

TABLE 4

|  | Main Material | Adhesive Material | Initial Adhesive Strength (kg/cm) | Degree of Retention of Adhesive Strength (%) | Difference in Acoustic Impedance (g/cm$^2$ · μsec) | $h_1/h_2$ (Detectability) |
|---|---|---|---|---|---|---|
| Comparative Example 1 | HDPE (A) | (10) | 6.5 | 74 | 2.8 × 10$^{-3}$ | 0.03 (x) |
| Comparative Example 2 | HDPE (A) | (11) | 9 | 27 | 29.1 × 10$^{-3}$ | 0.14 (◎) |
| Comparative Example 3 | HDPE (A) | (12) | 10 | 90 | 1.3 × 10$^{-3}$ | 0.01 (x) |
| Comparative Example 4 | HDPE (A) | (13) | 11.5 | 96 | 6.5 × 10$^{-3}$ | 0.05 (x) |
| Comparative Example 5 | HDPE (A) | (14) | 10.5 | 20 | 36.0 × 10$^{-3}$ | 0.15 (◎) |
| Comparative Example 6 | HDPE (A) | (15) | 5 | 5 to 25** | 21.1 × 10$^{-3}$ | 0.13 (◎) |
| Comparative Example 7 | HDPE (A) | (16) | 8 | 15 to 40** | 21.7 × 10$^{-3}$ | 0.13 (◎) |
| Comparative Example 8 | HDPE (B) | (12) | 7 | 83 | 4.3 × 10$^{-3}$ | 0.04 (x) |
| Comparative Example 9 | HDPE (B) | (16) | 6.5 | 21 to 47** | 26.3 × 10$^{-3}$ | 0.14 (◎) |

**means that scattering is large.

Examples 13 to 21 and Comparative Examples 10 to 16
(1) Production of Modified polyethylene Various modified polyethylenic resins used as the adhesive material component in the examples and comparative examples were produced as follows.

Modified PE (e)

To 100 parts by weight of a powder of HDPE (8) having a density of 0.951 g/cm and MFR of 0.85 g/10 min was added 0.01 part by weight of 2,5-dimethyl-2,5-tert-butylperoxyhexane, which were then dry blended for 2 minutes by the use of a Henschel mixer. Then, 0.35 part by weight of MAH was added, and the mixture was dry blended for additional 2 minutes. Pellets were produced while melt kneading the mixture obtained above, at a resin temperature of 255° C. by the use of an extruder. The amount of MAH grafted in the modified PE (e) thus obtained was 0.32% by weight.

Modified PE (f)

Modified PE (f) was produced by carrying out dry blending and melt kneading in the same manner as in modified PE (e) except that in place of HDPE (8) used in the production of modified PE (e), HDPE (9) having a density of 0.944 g/cm$^3$ and MFR of 0.40 g/10 min was used. The amount of MAH grafted in the modified PE (f) was 0.31% by weight.

Modified PE (g)

Dry blending and melt kneading was conducted in the same manner as in the modified PE (e) except that in place of HDPE (8) used in the production of modified PE (e), LLDPE (10) having a density of 0.924 g/cm$^3$ and MFR of 0.8 g/10 min (melting point 120° C., number of ethyl group branches per 1,000 carbon atoms of the main chain 10) was used. The amount of MAH grafted in the modified PE (g) obtained was 0.29% by weight.

Modified PE (h)

Dry blending and melt kneading were conducted in the same manner as in the modified PE (s) except that in place of HDPE (8) used in the production of modified PE (e), L-ULDPE (11) having MFR of 1.8 g/10 min (melting point 98° C., number of branching 75) was used, and melt kneading was changed to 230° C. The amount of MAH grafted in the modified PE (h) obtained was 0.26 g/cm$^3$.

Characteristics of unmodified L-ULDPE used likewise are as follows.

L-ULDPE (12)

Unmodified linear ultra low density polyethylenic resin having a density of 0.905 g/cm$^3$, MFR 1.02 g/10 min, a melting point of 120° C. and a number of branching of 30 as produced by the slurry polymerization method.

L-ULDPE (13)

Unmodified linear ultra low density polyethylenic resin having a density of 0.899 g/cm$^3$, MFR of 0.93 g/10 min, a melting point of 114° C. and a number of branching of 44 as produced by the slurry polymerization method.

L-ULDPE (14)

Unmodified linear ultra low density polyethylenic resin having a density of 0.907 g/cm$^3$, MFR of 9.0 g/10 min, a melting point of 121° C. and a number of branching of 23 as produced by the slurry polymerization method.

(2) Production of Adhesive Material

Modified polyethylenic resin (modified PE), unmodified polyethylenic resin (unmodified PE) and unmodified linear ultra low density polyethylenic resin (L-ULDPE), their types and compounding amounts being shown in Table 5, were dry blended in advance for 5 minutes by the use of a Henschel mixer. Each mixture obtained was kneaded while melting at a in temperature of 215° C. by the use of an extruder (diameter:,50 mm) to produce pellets (composition). The compositions (adhesive materials) (17) to (32) thus obtained were measured for density and acoustic impedance in the same manner as in Example 1. The results are shown in Tables 5 and 6.

container having an inner volume of 45 L (L=liter) and a total weight of 5.8 kg was produced at 220° C. by the use of a multi-layer blow molding machine having a 3-type 5-layer die in concentric circular form as provided with a molding machine to coextrude by the use of extruders having the respective diameters of 90 mm, 40 mm and 30 mm, in such a manner that the average thicknesses of the multiple layers were such that the inner and outer layers of the main material were 3.0 mm thick, the inner and outer layers of the adhesive material were 0.15 mm thick, and the EVOH layer was 0.10 mm thick. With regard to the adhesive strength prior to treatment of the container obtained, a piece having a width of 10 mm and a length of 150 mm was cut away from the flat portion of the rectangular container and measured for the adhesive strength between the adhesive material and EVOH layer according to the T-type peeling method by the use of a Tension-type tensile tester at a peeling speed of 50 mm/min. In addition, likewise, test pieces were cut away, and each test piece was allowed to stand for 72 hours in an oven at 110° C. and then dipped for 1,500 hours at 40° C. in a mixed solution consisting of 85% by volume of commercially available regular gasoline and 15% by volume of methyl alcohol. Then, each test piece was taken out and held

TABLE 5

| Adhesive Material | Modified PE | | Unmodified PE | | L-ULDPE | | Characteristics of Adhesive Material | |
|---|---|---|---|---|---|---|---|---|
| | Type | Amount (wt %) | Type | Amount (wt %) | Type | Amount (wt %) | Density (g/cm$^3$) | $Z_1$ (g/cm$^2$ · µsec) |
| (17) | (e) | 80 | — | — | L-ULDPE (13) | 20 | 0.939 | 2.090 × 10$^{-1}$ |
| (18) | (e) | 65 | — | — | L-ULDPE (13) | 35 | 0.932 | 2.032 × 10$^{-1}$ |
| (19) | (e) | 35 | LLDPE (10) | 55 | L-ULDPE (12) | 10 | 0.930 | 2.020 × 10$^{-1}$ |
| (20) | (e) | 35 | LLDPE (10) | 45 | L-ULDPE (12) | 20 | 0.928 | 2.011 × 10$^{-1}$ |
| (21) | (e) | 35 | LLDPE (10) | 35 | L-ULDPE (12) | 30 | 0.927 | 2.003 × 10$^{-1}$ |
| (22) | (f) | 30 | HDPE (8) | 45 | L-ULDPE (14) | 25 | 0.937 | 2.082 × 10$^{-1}$ |
| (23) | (e) (g) | 50 10 | LLDPE (10) | 15 | L-ULDPE (12) | 25 | 0.932 | 2.030 × 10$^{-1}$ |
| (24) | (e) (g) | 20 10 | HDPE (8) | 40 | L-ULDPE (12) | 30 | 0.934 | 2.050 × 10$^{-1}$ |
| (25) | (e) (g) | 25 15 | HDPE (8) LLDPE (10) | 25 15 | L-ULDPE (12) | 20 | 0.933 | 2.037 × 10$^{-1}$ |

TABLE 6

| Adhesive Material | Modified PE | | Unmodified PE | | L-ULDPE | | Characteristics of Adhesive Material | |
|---|---|---|---|---|---|---|---|---|
| | Type | Amount (wt %) | Type | Amount (wt %) | Type | Amount (wt %) | Density (g/cm$^3$) | $Z_1$ (g/cm$^2$ · µsec) |
| (26) | (e) | 97.5 | — | — | L-ULDPE (13) | 2.5 | 0.949 | 2.267 × 10$^{-1}$ |
| (27) | (e) | 50 | — | — | L-ULDPE (13) | 50 | 0.924 | 1.948 × 10$^{-1}$ |
| (28) | (f) | 10 | HDPE (8) | 80 | L-ULDPE (12) | 10 | 0.945 | 2.216 × 10$^{-1}$ |
| (29) | (e) | 75 | LLDPE (10) | 10 | L-ULDPE (14) | 15 | 0.940 | 2.150 × 10$^{-1}$ |
| (30) | (e) | 30 | LLDPE (10) | 10 | L-ULDPE (13) | 60 | 0.916 | 1.880 × 10$^{-1}$ |
| (31) | (h) | 25 | HDPE (8) | 60 | L-ULDPE (12) | 15 | 0.929 | 2.011 × 10$^{-1}$ |
| (32) | (e) | 50 | LLDPE (10) | 20 | L-ULDPE (11) | 30 | 0.928 | 2.003 × 10$^{-1}$ |

(3) Production of Multi-Layer Fuel Oil Container

As shown in Tables 5 and 6, the aforementioned adhesive materials (17) to (32) were used as the adhesive material, a high density polyethylenic resin (hereinafter referred to as HDPE (C)) having HLMFR of 50 g/10 min, a density of 0.945 g/cm$^3$, and an acoustic impedance of 2.23×10$^{-1}$ g/cm$^2$·µsec was used as the main material, and as the barrier material, EVOH having an ethylene content of 29 mol%, MFR (210° C., 2.16 kg) of 3.1 g/10 min, and a melting point of 191° C. was used. A 3-type 5-layer- multi-layer fuel oil for 150 hours under conditions of temperature of 23° C. and relative humidity of 50%, and then measured for the adhesive strength after the treatment.

In this way, the initial adhesive strength and degree of retention of the adhesive strength were measured, and the difference in acoustic impedance and detectability were measured in the same manner as in Example 1, with the results shown in Tables 7 and 8.

Example 22

The multi-layer fuel oil container obtained in Example 19 was finely divided by the use of a crusher, and pelletized while kneading at a temperature of 250° C. by the use of a coaxial twin-screw extruder. Particle diameter of EVOH dispersed in the pellet obtained was observed by the use of an optical microscope, and the average particle diameter was found to be 30 μm (maximum 55 μm). A dry blend mixture of 30% by weight of the pellets and 70% by weight of HDPE (C) was obtained. Using the above mixture in place of the main material of Example 19, and the same adhesive material and EVOH as in Example 19, a 3-type 5-layer fuel oil container was produced in the same manner.

The physical properties of the fuel oil container obtained were measured in the same manner as in Example 13. As a result, the initial adhesive strength was impossible to peel, the degree of retention of the adhesive strength was 100%, the difference in acoustic impedance was $19.8 \times 10^2$ $g/cm^2 \cdot \mu sec$, and $h_1/h_2 = 0.12$; both of performance and detectability were excellent.

butylperoxyhexane, which were then dry blended for 2 minutes by the use of a Henschel mixer. Then, 0.35 part by weight of MAH was added, and the mixture was dry blended for additional 2 minutes. :The mixture thus obtained was pelletized while melt kneading at a resin temperature of 260° C. by the use of an extruder. The amount of MAH grafted in the modified PE (i) obtained was 0.32% by weight.

Modified PE (j)

Modified PE (j) was produced by carrying out dry blending and melt-kneading in the same manner as in modified PE (i) except that in place of DPE (15) used in the production of modified PE (i), HDPE (16) having a density of 0.943 $g/cm^3$ and MRF of 0.40 g/10 min was used. The amount of MAH grafted in modified PE (j) was 0.30% by weight.

Modified PE (k)

Dry blending and melt kneading were carried out in the same manner as in modified PE (i) except that in place of HDPE (15) used in the production of modified PE (i), LLDPE (17) having a density of 0.924 $g/cm^3$ and MFR of 0.8 g/10 min (melting point 120° C., number of ethyl group branches per 1000 carbon atoms of the main chain 10) was

TABLE 7

| No. | Main Material | Adhesive Material | Initial Adhesive Strength (kg/cm) | Degree of Retention of Adhesive Strength (%) | Difference in Acoustic Impedance $(g/cm^2 \cdot \mu sec)$ | $h_1/h_2$ (Detectability) |
|---|---|---|---|---|---|---|
| Example 13 | HDPE (C) | (17) | ≧14.0* | 91 | $14.0 \times 10^{-3}$ | 0.10 (○) |
| Example 14 | HDPE (C) | (18) | ≧15.5* | 91 | $19.8 \times 10^{-3}$ | 0.12 (◎) |
| Example 15 | HDPE (C) | (19) | ≧17.0* | 93 | $21.0 \times 10^{-3}$ | 0.12 (◎) |
| Example 16 | HDPE (C) | (20) | ≧19.5* | 100 | $21.9 \times 10^{-3}$ | 0.12 (◎) |
| Example 17 | HDPE (C) | (21) | No peeling | 100 | $22.7 \times 10^{-3}$ | 0.13 (◎) |
| Example 18 | HDPE (C) | (22) | No peeling | 100 | $14.8 \times 10^{-3}$ | 0.11 (○) |
| Example 19 | HDPE (C) | (23) | No peeling | 100 | $20.0 \times 10^{-3}$ | 0.12 (◎) |
| Example 20 | HDPE (C) | (24) | No peeling | 100 | $18.0 \times 10^{-3}$ | 0.11 (○) |
| Example 21 | HDPE (C) | (25) | No peeling | 100 | $19.3 \times 10^{-3}$ | 0.12 (◎) |

*means cutting of the layer comprising the main material layer and adhesive material layer.

TABLE 8

| No. | Main Material | Adhesive Material | Initial Adhesive Strength (kg/cm) | Degree of Retention of Adhesive Strength (%) | Difference in Acoustic Impedance $(g/cm^2 \cdot \mu sec)$ | $h_1/h_2$ (Detectability) |
|---|---|---|---|---|---|---|
| Comparative Example 10 | HDPE (C) | (26) | 6.5 | 74 | $3.7 \times 10^{-3}$ | 0.03 (x) |
| Comparative Example 11 | HDPE (C) | (27) | 9 | 27 | $28.2 \times 10^{-3}$ | 0.14 (◎) |
| Comparative Example 12 | HDPE (C) | (28) | 10 | 90 | $1.4 \times 10^{-3}$ | 0.01 (x) |
| Comparative Example 13 | HDPE (C) | (29) | 11.5 | 96 | $8.0 \times 10^{-3}$ | 0.05 (x) |
| Comparative Example 14 | HDPE (C) | (30) | 10.5 | 20 | $35.0 \times 10^{-3}$ | 0.15 (◎) |
| Comparative Example 15 | HDPE (C) | (31) | 5 | 5–25** | $21.9 \times 10^{-3}$ | 0.13 (◎) |
| Comparative Example 16 | HDPE (C) | (32) | 8 | 15–40** | $22.7 \times 10^{-3}$ | 0.13 (◎) |

**means that scattering is large.

Examples 23 to 34 and Comparative Examples 17 to 24

(1) Production of Modified Polyethylene

Various modified polyethylenic resins used as the adhesive material component in the examples and comparative examples were produced as follows.

Modified PE (i)

To 100 parts by weight of a powder of HDPE (15) having a density of 0.950 $g/cm^3$ and MFR of 0.85 g/10 min was added 0.01 part by weight of 2,5-dimethyl-2,5-tertused. The amount of MAH grafted in the modified PE (k) obtained was 0.28% by weight.

Modified PE (l)

Dry blending and melt kneading were carried out in the same manner as in modified PE (i) except that in place of HDPE (15) used in the production of modified PE (i), L-ULDPE (18) having a density of 0.0891 $g/cm^3$ and MFR of 1.8 g/10 min (melting point 97° C., number of branching 70), and melt kneading was conducted at 230° C. The amount of MAH grafted in the modified PE (l) obtained was 0.25% by weight.

In addition, as unmodified linear ultra low density polyethylenes for use in the production of the adhesive material, L-ULDPE (12), L-ULDPE (13) and L-ULDPE (14) of Example 13 (1) were used.

(2) Production of Adhesive Material

Modified polyethylenic resin (modified PE), unmodified polyethylenic resin (unmodified PE) and unmodified linear ultra low density polyethylenic resin (L-ULDPE), the type and compounding amount of which are shown in Tables 9 and 10, were dry blended in advance for 5 minutes by the use of a Henschel mixer. Each mixture obtained was kneaded while melting at a resin temperature of 210° C. by the use of an extruder (diameter 50 mm) to produce pellets (composition). The density and acoustic impedance of the compositions (adhesive material) (33) to (49) were measured in the same manner as In Example 1. The results are shown in Tables 9 and 10.

A car fuel tank having an inner volume of 45 L and a total weight of 6.5 kg was produced by blow molding at 232° C. by the use of a multi-layer blow molding machine with a multi-layer die (concentric circular form) provided with molding machines to coextrude the main material and adhesive material, the type of each material being shown in Tables 11 and 12,and PA 6 in such a manner that the thicknesses of main material layer/adhesive material layer/polyamide resin (PA 6) layer/adhesive material layer/main material layer were 3.0 mm/0.15 mm/0.10 mm/0.15 mm/3.0 mm. A multi-layer piece having a width of 10 mm and a length of 150 mm was cut away from the flat portion of the tank obtained, and measured for the initial adhesive strength $P_0$ between the adhesive material layer and PA 6 according to the T-type pealing method by the use of a Tension-type tensile tester under the condition of peeling speed of 50 mm/min, with the results shown in Tables 11 and 12.

Moreover, after the same multi-layer piece was allowed to stand for 72 hours in an oven at 110° C., it was dipped at 40°

TABLE 9

| Adhesive Material | Modified PE Type | Amount (wt %) | Unmodified PE Type | Amount (wt %) | L-ULDPE Type | Amount (wt %) | Amount of Grafted MAH (wt %) | Characteristics of Adhesive Material Density (g/cm³) | $Z_1$ (g/cm² · μsec) |
|---|---|---|---|---|---|---|---|---|---|
| (33) | (i) | 75 | — | 0 | L-ULDPE (13) | 25 | 0.240 | 0.937 | $2.085 \times 10^{-1}$ |
| (34) | (i) | 65 | — | 0 | L-ULDPE (12) | 35 | 0.207 | 0.933 | $2.038 \times 10^{-1}$ |
| (35) | (i) | 20 | LLDPE (17) | 70 | L-ULDPE (12) | 10 | 0.064 | 0.927 | $1.992 \times 10^{-1}$ |
| (36) | (i) | 25 | LLDPE (17) | 50 | L-ULDPE (12) | 25 | 0.080 | 0.934 | $2.051 \times 10^{-1}$ |
| (37) | (i) | 40 | LLDPE (17) | 25 | L-ULDPE (12) | 35 | 0.128 | 0.927 | $2.000 \times 10^{-1}$ |
| (38) | (j) | 70 | LLDPE (17) | 15 | L-ULDPE (14) | 15 | 0.210 | 0.935 | $2.070 \times 10^{-1}$ |
| (39) | (i) (k) | 35 10 | LLDPE (17) | 30 | L-ULDPE (12) | 25 | 0.140 | 0.928 | $2.011 \times 10^{-1}$ |
| (40) | (i) (k) | 35 5 | HDPE (15) LLDPE (17) | 10 25 | L-ULDPE (12) | 25 | 0.126 | 0.930 | $2.020 \times 10^{-1}$ |
| (41) | (i) | 40 | HDPE (16) | 40 | L-ULDPE (13) | 20 | 0.128 | 0.936 | $2.072 \times 10^{-1}$ |

TABLE 10

| Adhesive Material | Modified PE Type | Amount (wt %) | Unmodified PE Type | Amount (wt %) | L-ULDPE Type | Amount (wt %) | Amount of Grafted MAH (wt %) | Characteristics of Adhesi Material Density (g/cm³) | $Z_1$ (g/cm² · μsec) |
|---|---|---|---|---|---|---|---|---|---|
| (42) | (i) (k) | 25 25 | HDPE (15) | 25 | L-ULDPE (14) | 30 | 0.150 | 0.928 | $2.015 \times 10^{-1}$ $2.258 \times 10^{-1}$ |
| (43) | (i) | 97.5 | — | 0 | L-ULDPE (13) | 2.5 | 0.312 | 0.948 | $2.193 \times 10^{-1}$ |
| (44) | (i) | 70 | HDPE (16) | 20 | L-ULDPE (12) | 10 | 0.224 | 0.943 | $2.160 \times 10^{-1}$ |
| (45) | (i) | 75 | LLDPE (17) | 15 | L-ULDPE (14) | 15 | 0.240 | 0.941 | $1.940 \times 10^{-1}$ |
| (46) | (j) | 50 | — | 0 | L-ULDPE (12) | 50 | 0.150 | 0.923 | $1.886 \times 10^{-1}$ |
| (47) | (i) | 20 | LLDPE (17) | 35 | L-ULDPE (13) | 10 | 0.064 | 0.917 | $1.971 \times 10^{-1}$ |
| (48) | (l) | 30 | HDPE (15) | 60 | L-ULDPE (12) | 25 | 0.075 | 0.926 | |
| (49) | (i) | 60 | LLDPE (17) L-ULDPE (18) | 15 25 | — | 0 | 0.192 | 0.930 | $1.978 \times 10^{-1}$ |

(3) Production of Multi-Layer Fuel Oil Container

As shown in Tables 11 and 12, the aforementioned adhesive materials (33) to (49) were used as the adhesive materials, and as the main materials, high density polyethylenic resins (HDPE (D)) having HLMFR of 5.0 g/10 min, a density of 0.945 g/cm³ and an acoustic impedance ($Z_0$) of $2.23 \times 10^{-1}$ g/cm²·μsec, and high density polyethylanic resins (HDPE (E)) having MFR of 0.5 g/10 min, a density of 0.948 g/10 cm³ and $Z_0$ o f $2.255 \times 10^{-1}$ g/cm²·μsec were used.

In addition, as the polyamide resin, a Nylon 6 (hereinafter referred to as "PA6") having a relative viscosity of 4.2 was used.

C. for 1,500 hours in a mixed solution comprising 90% by volume of commercially available regular gasoline and 10% by volume of methyl alcohol. Then, each piece was taken out and held for 168 hours under conditions of temperature of 23° C. and relative humidity of 50%. After these treatments, the adhesive strength $P_1$ was measured under the same conditions, and by comparison with $P_0$ previously measured, the degree of retention of the adhesive strength (value of $P_1$ when $P_0$ was 100) was-determined for evaluation of the long term heat resistance and fuel oil resistance; evaluation is shown in Tables 11 and 12.

Moreover, the difference (ΔZ) in acoustic impedance between the main material layer and adhesive material layer, aforementioned $h_1/h_2$ and the judgement of the presence or absence of detection based thereon were conducted in the same manner as in Example 1, with the results shown in Tables 11 and 12.

Example 35

The multi-layer tank obtained in Example 30 was finely divided by the use of a crusher, and pelletized while kneading at a temperature of 265° C. by the use of a coaxial twin-screw extruder. Observation of dispersion particle diameter of PA 6 in the pellet obtained by the use of an optical microscope showed that the average particle diameter was 45 μm (maximum 70 μm). A mixture comprising 30% by weight of the pellets, and 70% by weight of a high molecular high density polyethylenic resin having a density of 0.945 g/cm³ and HLMFR of 4.8 g/min was produced by dry blending. In the same manner as in Example 30 except that the one to which 1 part by weight of the high molecular weight high density polyethylenic resin had been dry blended, was used as the main material layer, a car fuel oil tank was produced. The detectability of the tank obtained was determined in the same manner as in Example 23, and $h_1/h_2$ was 0.12; it was detectable.

Example 36

Using the adhesive material (9) used in Example 9, high density polyethylene (HDPE (F)) having a density of 0.946 g/cm³ and MFR of 0.3 g/10 min. as the main material, and as the barrier material, EVOH having an ethylene content of 30 mol*, a melting point by the DSC method of 188° C., MFR at 230° C. of 4.8 g/10 min, and a density of 1.19 g/cm, a 3-type 5-layer multi-layer blow container with 20 liter volume having such average thicknesses that each of the inner and outer layers of the main material was 1.5 mm, each of the inner and outer layers of the adhesive material was 0.10 mm, and the EVOH layer was 0.05 mm was produced by the use of a multi-layer blow molding machine provided with extruders having the respective diameters of 90 mm, 40 mm and 30 mm, and having a 3-type 5-layer die in a concentral circular form.

An attempt to measure the adhesive strength between the EVOH and adhesive material layers was made for a multi-layer piece cut away from the flat portion of the container obtained, but with no peeling.

In addition, the piece was dipped at 40° C. for 2,500 hours in edible oil containing linolic acid as the major component and then it was attempted to measure the adhesive strength

TABLE 11

| No. | Main Material | Adhesive Material | Initial Adhesive Strength (kg/cm) | Degree of Retention of Adhesive Material (%) | Difference in Acoustic Impedance (g/cm² · μsec) | $h_1/h_2$ (Detectability) |
|---|---|---|---|---|---|---|
| Example 23 | HDPE (D) | (33) | ≧14* | 95 | 14.5 × 10⁻³ | 0.11 (o) |
| Example 24 | HDPE (D) | (34) | ≧17* | 100 | 19.2 × 10⁻³ | 0.12 (◎) |
| Example 25 | HDPE (D) | (35) | ≧18 | 91 | 23.8 × 10⁻³ | 0.13 (◎) |
| Example 26 | HDPE (D) | (36) | ≧25* | 88 | 17.9 × 10⁻³ | 0.11 (o) |
| Example 27 | HDPE (D) | (37) | No peeling | 100 | 23.0 × 10⁻³ | 0.13 (◎) |
| Example 28 | HDPE (D) | (38) | No peeling | 98 | 16.0 × 10⁻³ | 0.11 (o) |
| Example 29 | HDPE (D) | (39) | No peeling | 100 | 21.9 × 10⁻³ | 0.12 (◎) |
| Example 30 | HDPE (D) | (40) | No peeling | 100 | 21.0 × 10⁻³ | 0.12 (◎) |
| Example 31 | HDPE (D) | (41) | No peeling | 100 | 15.8 × 10⁻³ | 0.11 (o) |
| Example 32 | HDPE (D) | (42) | No peeling | 100 | 21.5 × 10⁻³ | 0.12 (◎) |
| Example 33 | HDPE (E) | (40) | No peeling | 94 | 9.5 × 10⁻³ | 0.09 (Δ) |
| Example 34 | HDPE (E) | (40) | No peeling | 96 | 26.3 × 10⁻³ | 0.14 (◎) |

*means cutting of the layer comprising the main material layer and adhesive material layer.

TABLE 12

| No. | Main Material | Adhesive Material | Initial Adhesive Strength (kg/cm) | Degree of Retention of Adhesive Material (%) | Difference in Acoustic Impedance (g/cm² · μsec) | $h_1/h_2$ (Detectability) |
|---|---|---|---|---|---|---|
| Comparative Example 17 | HDPE (D) | (43) | 8 | 76 | 2.8 × 10⁻³ | 0.03 (x) |
| Comparative Example 18 | HDPE (D) | (44) | 11 | 92 | 3.7 × 10⁻³ | 0.03 (x) |
| Comparative Example 19 | HDPE (D) | (45) | 12 | 100 | 7.0 × 10⁻³ | 0.06 (x) |
| Comparative Example 20 | HDPE (E) | (44) | 11 | 97 | 6.2 × 10⁻³ | 0.05 (x) |
| Comparative Example 21 | HDPE (D) | (46) | 9 | 21 | 29.0 × 10⁻³ | 0.14 (◎) |
| Comparative Example 22 | HDPE (D) | (47) | 10 | 28 | 34.4 × 10⁻³ | 0.15 (◎) |
| Comparative Example 23 | HDPE (D) | (48) | 7 | 3–15* | 25.9 × 10⁻³ | 0.14 (◎) |
| Comparative Example 24 | HDPE (D) | (49) | 8 | 20–35* | 23.2 × 10⁻³ | 0.13 (◎) |

*means that scattering is large.

between the EVOH layer and adhesive material layer in the same manner. However, no peeling occurred, and excellent adhesive durability was exhibited.

Moreover, the above 20 liter multi-layer container was measured for a value of $h_1/h_2$ as a measure of detectability in the same manner as above, using a supersonic wave of 20 MHz $h_1/h_2$=0.12; excellent detectability was exhibited.

Industrial Applicability

The multi-layer laminate molding of the present invention is excellent in barrier properties and at the same time, has greatly suitable characteristics from a viewpoint of quality control or process control that non-destructive detection of the adhesive material layer can be carried out easily by the supersonic reflection method. Accordingly, moldlings having the multi-layer laminate structure as in the present invention can be widely utilized, in a desired form, as wrapping containers of fuel oil edible oil and so forth, wrapping sheets, wrapping bags, industrial materials, and so forth.

We claim:

1. A multi-layer laminate fuel oil container of a multi-layer structure having (a) inner and outer main material layers made mainly of a polyethylenic resin, thickness of each main material layer being 0.5 to 7 mm, (b) an intermediate layer made of an ethylene-vinyl acetate copolymer saponified product or polyamide resin, thickness of the intermediate layer being 10 $\mu$m to 2 mm, and (c) an adhesive material layer between each of the main material layers and the intermediate layer, the inner and outer main material layers, the intermediate layer and adhesive material layers being laminated together, a thickness of each adhesive material layer being 10 $\mu$m to 2 mm, and having a difference in acoustic impedance between the main material layer and the adjacent adhesive material layer as determined using a supersonic wave of 20 to 25 MHz of at least $8.5 \times 10^{-3}$ g/cm$^2$·$\mu$sec, whereby the presence of the adhesive material can be detected by supersonic wave reflection, and wherein each said adhesive material layer consists of:

(A) 62 to 95% by weight of a polyethylenic resin component which contains at least 15% by weight based on the total adhesive material content of (1) a linear low density polyethylenic resin having a density of from 0.910 g/cm$^3$ to less than 0.935 g/cm$^3$, a melt flow rate of 0.1 to 50 g/min, a melting point as determined with a differential scanning calorimeter of 115° to 130° C., and a number of short chain branches per 1000 carbon atoms of the main chain of 5 to 30, and at least 0.1% by weight of (2) a modified high density polyethylenic resin obtained by grafting unsaturated carboxylic acid and/or its derivative onto a high density polyethylenic resin having a density of at least 0.930 g/cm$^3$, a number of short chain branches per 1000 carbon atoms of the main chain of not more than 20, and a melt flow rate of at least 0.01 g/10 min, and of (3) a modified linear low density polyethylenic resin obtained by grafting unsaturated carboxylic acid and/or its derivative onto said linear low density polyethylenic resin (1), and (B) 38 to 5% by weight of a linear ultra low density polyethylenic resin component having a density of from 0.890 g/cm$^3$ to less than 0.910 g/cm$^3$, a number of short chain branches per 1000 carbon atoms of the main chain of 18 to 60, a melt flow rate of 0.1 to 30 g/10 min, and a melting point as determined by the differential scanning calorimeter of 110° to 125° C.;

said adhesive material layer having a density of at least 0.925 g/cm$^3$ and a proportion of the unsaturated carboxylic acid and/or its derivative grafted of 0.001 to 5.0% by weight.

2. The multi-layer laminate fuel oil container as claimed in claim 1 wherein the multi-layer structure consists essentially of said inner and outer main material layers, said intermediate layer and said adhesive material layer between each of the main material layers and the intermediate layer.

3. The multi-layer laminate fuel oil container as claimed in claim 1 wherein the multi-layer structure consists of said inner and outer material layers, said intermediate layer and said adhesive layer between each of the main material layers and the intermediate layer.

4. The multi-layer laminate fuel oil container as claim 1 wherein said difference in acoustic is at least $9.0 \times 10^{-3}$ g/cm$^2$·$\mu$sec.

5. The multi-layer laminate fuel oil container as claim 10 wherein said difference in acoustic is at least $9.5 \times 10^{-2}$ g/cm$^2$·$\mu$sec.

6. The multi-layer laminate fuel oil container as claimed in claim 1 wherein the polyethylenic resin component contains at least 1.0% by weight of the modified high density polyethylenic resin (2) and of the modified linear low density polyethylenic resin (4).

7. The multi-layer laminate fuel oil container as claimed in claim 1 wherein the polyethylenic resin component contains at least 2.5% by weight of the modified high density polyethylenic resin (2) and of the modified linear low density polyethylenic resin (3).

8. The multi-layer laminate fuel oil container as claimed in claim 1 wherein each said adhesive material layer has an acoustic impedance of at least $1.980 \times 10^{-1}$ g/cm$^2$·$\mu$sec.

9. The multi-layer laminate fuel oil container as claimed in claim 1 wherein each said adhesive material layer has an acoustic impedance of at least $1.984 \times 10^{-1}$ g/cm$^2$·$\mu$sec.

10. The multi-layer laminate fuel oil container as claimed in claim 1 wherein the container consists essentially of the multi-layer structure.

11. The multi-layer laminate fuel oil container as claimed in claim 1 wherein the fuel oil container consists of the multi-layer structure.

12. A method of detecting presence or absence of adhesive material of the multi-layer laminate fuel oil container as claimed in claim 1, comprising applying a supersonic wave to said multi-layer structure and detecting pulse waves reflected from the respective layers so as to detect the presence or absence of the adhesive material.

13. The method as claimed in claim 12, wherein said supersonic wave has a frequency in a range of 20–25 MHz.

14. The method as claimed in claim 12, wherein said detecting includes measuring at least a reflected wave intensity peak from a main material layer, from an adjacent adhesive material layer and from the intermediate layer, to determine the presence or absence of said adjacent adhesive material layer.

* * * * *